(12) United States Patent
Dragic

(10) Patent No.: US 7,558,300 B2
(45) Date of Patent: Jul. 7, 2009

(54) INJECTION SEEDED, Q-SWITCHED FIBER RING LASER

(76) Inventor: Peter Dragic, 4631 N. Malden #2N, Chicago, IL (US) 60640

( * ) Notice: Subject to any disclaimer, the term of this patent is extended or adjusted under 35 U.S.C. 154(b) by 0 days.

(21) Appl. No.: 11/017,192

(22) Filed: Dec. 20, 2004

(65) Prior Publication Data

US 2006/0133432 A1 Jun. 22, 2006

Related U.S. Application Data

(60) Provisional application No. 60/530,499, filed on Dec. 18, 2003.

(51) Int. Cl.
*H01S 3/117* (2006.01)
*H01S 3/083* (2006.01)

(52) U.S. Cl. .......................... 372/13; 372/94
(58) Field of Classification Search .................. 372/13, 372/94
See application file for complete search history.

(56) References Cited

U.S. PATENT DOCUMENTS

2004/0114641 A1 * 6/2004 Wise et al. ..................... 372/6

* cited by examiner

*Primary Examiner*—Armando Rodriguez

(57) ABSTRACT

A narrow linewidth, injection seeded, Q-switched Er fiber ring oscillator, that provides over 600 µW of average output power at 500 Hz, with 1.2 µJ per pulse, before the output appears to be significantly affected by stimulated Brillouin scattering. This laser configuration provides multiple advantages in LIDAR systems because it offers the possibility of broad and rapid tunability.

1 Claim, 4 Drawing Sheets

Basic experimental setup. The output of the MAC-1 was connected to the input of a 90/10 coupler. The ring laser operated clockwise in this configuration. The AOM was used as the Q-switch in pulsed mode.

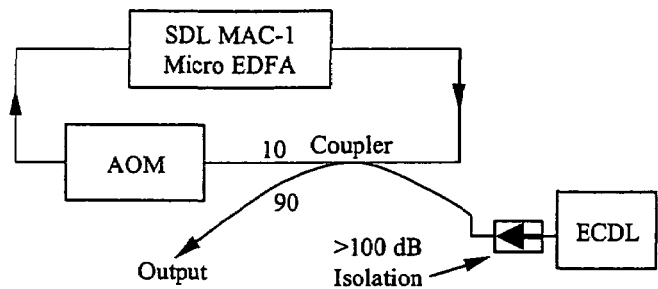
Fig. 1. Basic experimental setup. The output of the MAC-1 was connected to the input of a 90/10 coupler. The ring laser operated clockwise in this configuration. The AOM was used as the Q-switch in pulsed mode.
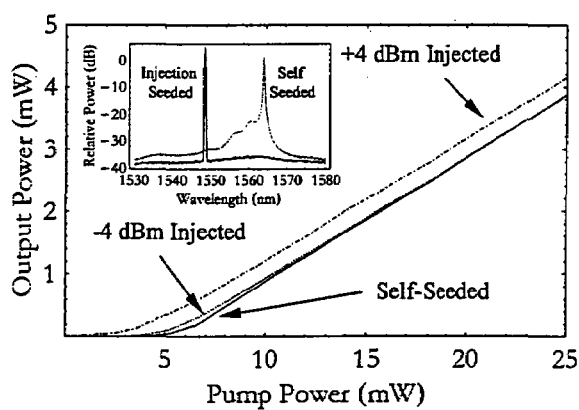
Fig. 2. LI Curve in CW mode, with varied injected seed power at 1548nm. Injection- (+4dBm injected power) and self-seeded spectra are in the inset.

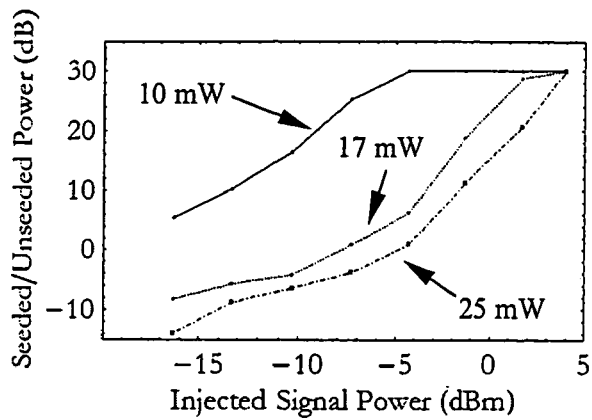
Fig. 3. Seeding effectiveness as a function of injected seed (1548 nm) power for 10, 17, and 25mW of pump power.
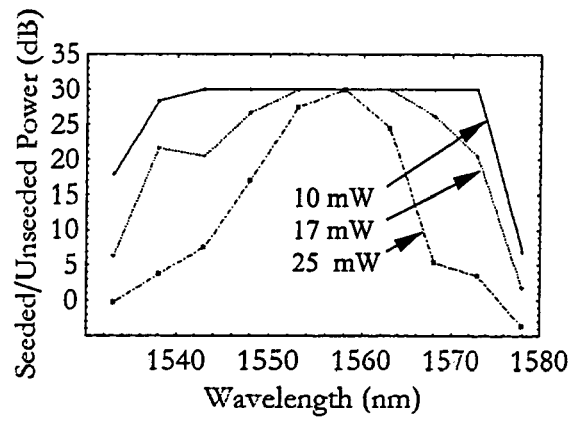
Fig. 4. Seeding effectiveness as a function of wavelength for 10, 17, and 25mW of pump power at +1dBm of injected seed power.

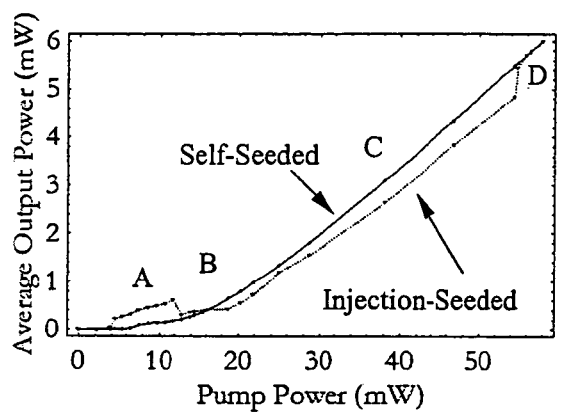
Fig. 5. LI curve (average power) for the Q-switched fiber ring laser. +4dBm of injected seed power was used at a wavelength of 1546 nm. There are 4 distinct operating 'zones' for the laser.

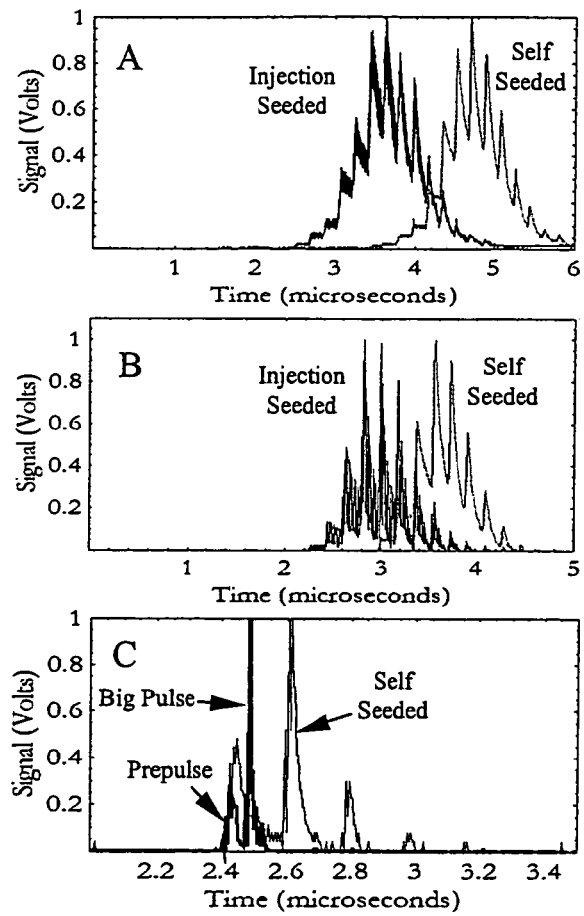
Fig. 6. Normalized pulse shapes at operating point A (10mW pump power), B (15mW), and C (22mW). The seeded pulses are the darker lines. The Q-switch opens at about t=1.85µs.

US 7,558,300 B2

INJECTION SEEDED, Q-SWITCHED FIBER RING LASER

CROSS-REFERENCE TO RELATED APPLICATION

This application claims priority from U.S. Provisional Patent Application Ser. No. 60/530,499 filed Dec. 18, 2003, entitled "Injection Seeded, Q-Switched Fiber Ring Laser," the entire specification of which is hereby incorporated by reference.

BACKGROUND OF THE INVENTION

1. Field of the Invention

The present invention is directed to lasers, and more particularly to an injection seeded, q-switched fiber ring laser.

2. Background Art

Fiber lasers are particularly attractive for optical remote sensing (or LIDAR) due to a number of key advantages over more traditional lasers for this application. Superior beam quality from a single mode fiber, minimal beam jitter, high efficiency, high brightness, passive cooling, and compactness make them attractive for both terrestrial and space applications. Furthermore, fiber lasers provide the required tunability and the potential of very narrow linewidth in the master oscillator-power amplifier (MOPA) configuration for spectroscopic applications such as differential absorption LIDAR (DIAL) or resonance scattering.

When operated in pulsed mode, MOPA fiber lasers suffer from amplified spontaneous emission (ASE) that degrades overall laser performance. Saturating the power amplifier (PA) with the master oscillator (MO) avoids this problem by depleting the upper state. Otherwise, fluorescence will drain energy into ASE, depleting signal gain. Depending on the rare-earth dopant, glass composition, and fiber geometry, required MO power ranges anywhere from a few hundred μW to several tens of mW, average power, while all of this power must be in the pulses. Microchip lasers are a good MO solution and very high PA peak powers have been achieved using them. However, they are not broadly tunable making them unsuitable for a number of key LIDAR applications.

Fiber ring lasers are a particularly attractive way to achieve high average power because they can be constructed with broad tunability in narrow linewidth. Furthermore, they can be Q-switched with a number of techniques to provide high peak powers and low noise.

BRIEF DESCRIPTION OF THE DRAWINGS

FIG. 1. Basic experimental setup. The output of the MAC-1 was connected to the input of a 90/10 coupler. The ring laser operated clockwise in this configuration. The AOM was used as the Q-switch in pulsed mode.

FIG. 2. LI Curve in CW mode, with varied injected seed power at 1548 nm. Injection–(+4 dBm injected power) and self-seeded spectra are in the inset.

FIG. 3. Seeding effectiveness as a function of injected seed (1548 nm) power for 10, 17, and 25 mW of pump power.

FIG. 4. Seeding effectiveness as a function of wavelength for 10, 17, and 25 mW of pump power at +1 dBm of injected seed power.

FIG. 5. LI curve (average power) for the Q-switched fiber ring laser. +4 dBm of injected seed power was used at a wavelength of 1546 nm. There are 4 distinct operating 'zones' for the laser.

FIG. 6. Normalized pulse shapes at operating point A (10 mW pump power), B (15 mW), and C (22 mW). The seeded pulses are the darker lines. The Q-switch opens at about t=1.85 μs.

DETAILED DESCRIPTION OF THE DRAWINGS

Accordingly, we present an injection-seeded ring oscillator. Broad tunability is achieved through injection seeding with a stable, tunable external cavity diode laser (ECDL). Furthermore, for truly rapid and stable tunability, we can take the example from telecommunications and multiplex any number of these seed sources and access them as desired. Thus, DBR or DFB seeders would be compelling for size.

FIG. 1 shows the basic experimental setup. High quality erbium doped fiber amplifier (EDFA) micro modules are commercially available. We employed an SDL MAC-1 EDFA complete with 976 nm pump diode, wavelength division multiplexer (WDM), thermal control, output isolator, and FC/APC fiber pigtails. The output isolator in the EDFA guaranteed unidirectional laser operation. The laser did not have single polarization, resulting in some instability.

We used a fiber coupled acousto-optic modulator (AOM) (Brimrose Corp.) as the Q-switch and an Agilent 81682A ECDL provided seeding. The seeder was isolated >100 dB to protect it from any potential optical damage. The AOM had a maximum diffraction efficiency of about 60% at 1550 nm, an acoustic frequency of 90 MHz, and rise time of 25 ns. A 90/10 broadband coupler completed the ring. With the output of the EDFA connected to the input of the coupler, the 90-arm output was the laser output. This ensured that 90% of the seed power was injected into the ring when launched into the other input arm. Even with a 90% output coupler, the ring laser operated remarkably efficiently.

This configuration provides an undesired CW output component in pulsed mode, which was subtracted from all LI data in this work. Several alternate configurations are possible to remove this, such as employing a pulsed seeder, or another output coupler beyond the EDFA. Or, taking the output between the AOM and EDFA ensures no off-pulse ASE.

FIG. 2 provides a CW LI curve for the ring laser in both injection—(at an arbitrary 1548 nm) and self-seeded modes. Spectra are provided in the inset with the seeder turned on and off at an arbitrary pump power. From the spectra, we see that injection seeding can completely suppress self-seeding. The LI curve reveals that the laser operates more efficiently when injection-seeded. Furthermore, at low injection power, the laser unlocks as the pump level increases and self-seeding dominates the lasing process. This is consistent with the theory found in, where a minimum amount of (narrow band) power is needed to successfully injection-seed at a given pump power. The required seed power increases as pump power is increased.

A number of unknowns in the experimental setup make it difficult to fit injection-seeding theory into this analysis. This includes all sources of loss, and any wavelength dependent loss in the AOM. However, when the ring is partly seeded, injection- and self-seeding compete for gain and thus both wavelengths are detected from the ring laser. Thus, we instead show the dependence of the ratio [averaged injection-seeded output power/averaged self-seeded outputpower] on the injected seeding power at 1548 nm (FIG. 3). Beyond a ratio of about 30 dB, the self-seeded contribution is completely suppressed and it makes little sense to provide a 'ratio.' Thus, we define an arbitrary ceiling in the data at 30 dB and call this 'completely seeded.' FIG. 4 shows the wavelength dependence of this ratio at various pump powers, with +1 dBm of seed power.

Finally, the ring laser is operated in pulsed mode. The Q-switch ran at 500 Hz and was open for 5 μs. An LI curve (average output power) for pulsed operation is provided in FIG. 5 at an arbitrary 1546 nm. From the plot, there appear to be 4 distinct operating 'zones' for the locked fiber laser. In order to explain the operation of the ring laser, we display pulse shapes at each of regions A, B, and C. The pulses were taken from a fast InGaAs APD to a 500 MHz oscilloscope.

From FIG. 6, we see that normal seeding occurs in region A. The Q-switch opens at about 1.85 μs. As expected, the injection-seeded pulse appears earlier than the self-seeded pulse due to the presence of a seeder 'head start.' Furthermore, the pulses exhibit a characteristic comb-like shape due to the round trip time in the ring cavity (180 ns) [6]. There does appear to be jitter, other added noise, in the seededpulse. This may be the result of polarization effects because the ECDL is polarized and the EDFA is not. We observed variations in the noise magnitude by coiling cavity fiber in random ways.

In region B, both the injection- and self-seeded pulses exhibit sharpening of the peaks of the comb, and now more resemble pulse trains. The injection-seeded pulse acquires greater instability as well. From the LI curve, the injection-seeded output power appears to drop and remain constant. This may be consistent with the onset of stimulated Brillouin scattering (SBS). A similar phenomenon was observed when this EDFA was operated as a linear power amplifier, but at much greater pumping levels. This makes sense when we consider the small mode field diameters (~5 μm at 1550 nm) and long fiber lengths (10-20 meters) used in EDFAs. The ECDL has a linewidth of <100 kHz.

In region C, beyond about 18 mW of pump power, injection-seeded output power once again begins increasing, and the seeded pulse locks into the jittery form shown in FIG. 6c. This new pulse shape may be the result of second order SBS, back reflecting light towards the output [9]. Seed light is amplified and initiates backward SBS, where there is an initial drop in forward power. This defines the prepulse. Once back-reflected light reaches a critical level, it is reflected forward from secondary SBS. If this is true, then the prepulse and big pulse (~6 ns pulse width) of FIG. 6c should be separated in optical frequency by twice the Brillouin shift (~20 GHz), potentially enabling the capability to separate them. It should be noted that the AOM appeared to do a good job of isolating the setup from back-propagating light.

We did not observe this phenomenon in self-seeded mode. An increased SBS threshold may be due to several reasons: 1) broad linewidth (>10 MHz); 2) dual wavelength operation from two polarization modes; 3) pulse sharpening, shortening the SBS interaction length; 4) overall pulse narrowing with increasing power (spectral broadening); 5) and long cavity transit time (180 ns), greater than the phonon lifetime (10-100 ns). In region D, the ring rapidly unlocks from the seed laser and the pulse takes the shape of the self-seeded shape shown in FIG. 6c, with 3 distinct 30 ns pulses in the train.

We demonstrated narrow linewidth injection seeding in a Q-switched fiber ring laser. Further extensions of this work would include moving to polarization maintaining (PM) fiber and incorporating some method to suppress or use SBS. Higher seed/pump power may lead to upper state depletion in three passes or less around the ring, and coupling this with a shorter cavity length can serve to narrow the pulse width.

The invention claimed is:
1. A ring laser comprising:
an AOM having an input and an output;
a micro amplifier having an input coupled to the output of the AOM, and an output;
a 90/10 coupler having two input and two outputs, a 90 output and a 10 output, one input coupled to the output of the micro amplifier, the 10 output coupled to the input of the AOM; and
a laser having an output, the output coupled the other input of the coupler,
wherein the output of the laser is the 90 output of the coupler, and the AOM is used as a Q-switch in pulsed mode.

* * * * *